(12) United States Patent
Yamada et al.

(10) Patent No.: US 8,118,475 B2
(45) Date of Patent: Feb. 21, 2012

(54) KNEADING DEGREE ADJUSTING APPARATUS, EXTRUDER AND CONTINUOUS KNEADER

(75) Inventors: Sayaka Yamada, Kobe (JP); Kazuo Yamaguchi, Takasago (JP); Yasuaki Yamane, Takasago (JP); Koichi Honke, Kobe (JP); Kazuhisa Fukutani, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/864,538

(22) PCT Filed: Jan. 29, 2009

(86) PCT No.: PCT/JP2009/051426
§ 371 (c)(1),
(2), (4) Date: Jul. 26, 2010

(87) PCT Pub. No.: WO2009/096450
PCT Pub. Date: Aug. 6, 2009

(65) Prior Publication Data
US 2010/0309745 A1 Dec. 9, 2010

(30) Foreign Application Priority Data
Jan. 30, 2008 (JP) .................. 2008-019442

(51) Int. Cl.
*B29C 47/74* (2006.01)
*B29B 7/48* (2006.01)
(52) U.S. Cl. .......................... 366/80; 366/85
(58) Field of Classification Search .............. 366/79–80, 366/82–85, 88–90; 425/200–209
See application file for complete search history.

(56) References Cited

U.S. PATENT DOCUMENTS

| 2,519,014 | A | * | 8/1950 | Bankey | 425/208 |
| 3,870,285 | A | * | 3/1975 | Bausch et al. | 366/80 |
| 3,981,658 | A | * | 9/1976 | Briggs | 425/205 |

(Continued)

FOREIGN PATENT DOCUMENTS

JP          4 28505          1/1992

(Continued)

OTHER PUBLICATIONS

U.S. Appl. No. 12/681,121, filed Apr. 1, 2010, Yamaguchi, et al.

*Primary Examiner* — Charles E Cooley
(74) *Attorney, Agent, or Firm* — Oblon, Spivak, McClelland, Maier & Neustadt, L.L.P.

(57) ABSTRACT

Provided is a kneading degree adjusting apparatus, which can have a wide adjusting range for a kneading degree even if a gate member and a cylindrical segment are not made so close as to invite a fear of metallic contacts. The kneading degree adjusting apparatus is disposed in a kneading treatment equipment, which includes a cylindrical segment formed at a predetermined portion and a kneading screw for kneading a material while feeding the same to the downstream side, thereby to adjust the kneading degree of the material. The kneading degree adjusting apparatus comprises a gate member having an opposed face confronting the outer circumference of the cylindrical segment and moved toward and away from the outer circumference of the cylindrical segment thereby to change the area of the material passage to be formed between the opposed face and the outer circumference of the cylindrical segment. The outer circumference and the opposed face are corrugated to form the passage into a bent shape.

7 Claims, 6 Drawing Sheets

U.S. PATENT DOCUMENTS

| | | | |
|---|---|---|---|
| 4,007,545 A * | 2/1977 | Briggs | 34/397 |
| 4,136,968 A * | 1/1979 | Todd | 366/85 |
| 5,672,005 A * | 9/1997 | Fukui et al. | 366/75 |
| 6,280,074 B1 * | 8/2001 | Kuroda et al. | 366/76.3 |
| 7,677,787 B2 * | 3/2010 | Yamane et al. | 366/80 |
| 7,802,915 B2 * | 9/2010 | Yamada et al. | 366/80 |
| 2010/0271901 A1 * | 10/2010 | Yamaguchi et al. | 366/79 |
| 2010/0309745 A1 * | 12/2010 | Yamada et al. | 366/89 |

FOREIGN PATENT DOCUMENTS

| | | |
|---|---|---|
| JP | 5 72425 | 10/1993 |
| JP | 10 128740 | 5/1998 |
| JP | 2000-309017 | * 11/2000 |
| JP | 2007 15348 | 1/2007 |

* cited by examiner

KNEADING DEGREE ADJUSTING APPARATUS, EXTRUDER AND CONTINUOUS KNEADER

TECHNICAL FIELD

The present invention relates to a kneading degree adjusting apparatus, an extruder, and a continuous kneader.

BACKGROUND ART

In general, a compound resin material such as a plastic compound is manufactured by supplying a pellet or powder of a polymer resin serving as a base material into a barrel of an extruder or a continuous kneader together with an additive, and feeding the base material and the additive to the downstream side while kneading the base material and the additive with a kneading screw inserted into the barrel. A kneading degree of a material in the extruder and the continuous kneader is increased as the material remains in a kneading section in the barrel so that a kneading time is extended. Therefore, a kneading degree adjusting apparatus provided with a gate member for interrupting the material is provided on the downstream side of the kneading section in the extruder and the continuous kneader of the conventional art.

For example, the following Patent Document 1 discloses such a kneading degree adjusting apparatus. This kneading degree adjusting apparatus is provided with a cylindrical root diameter part (a cylindrical segment) formed in an intermediate part of a kneading screw in the axial direction. A gate member which is movable toward and away from the root diameter part is provided at a position of a barrel corresponding to this root diameter part in the axial direction.

When this gate member is moved toward the root diameter part, the area of a passage through which a material passes is reduced so that the material does not easily flow to the downstream side. Accordingly, the material remains in a kneading section so that the kneading degree is increased. When the gate member is moved away from the root diameter part (the cylindrical segment), the material easily flows so that the kneading degree of the material is decreased. That is, in the kneading degree adjusting apparatus of Patent Document 1, the material passage is opened and closed by the gate member thereby to adjust the kneading degree.

In recent years, in order to correspond to various compound resin materials, there is a strong demand for a wider adjusting range for the kneading degree than an adjusting range of a conventional kneading degree adjusting apparatus. In the conventional kneading degree adjusting apparatus, since an opening and closing range of the gate member is determined from a relationship with a barrel diameter, a lower limit of the kneading degree is not easily lowered. Therefore, in order to widen the adjusting range for the kneading degree, there is a need for raising an upper limit of the adjusting range for the kneading degree over that of the conventional kneading degree adjusting apparatus. Thus, the gate member is required to be movable closer to the cylindrical segment.

However, when the gate member is moved excessively close to the cylindrical segment in the kneading degree adjusting apparatus of Patent Document 1, there is a fear of metallic contacts between the gate member and the cylindrical segment. When the metallic contacts are caused, there are possibilities that the gate member and the cylindrical segment are abnormally worn away and the kneading quality is lowered due to contamination of seizure or the like. Therefore, in the kneading degree adjusting apparatus of Patent Document 1, the gate member cannot be moved closer to the cylindrical segment over the present predetermined distance, and hence the adjusting range for the kneading degree cannot be widened.

Patent Document 1: Japanese Utility Model Laid-Open No. 1993-72425

DISCLOSURE OF THE INVENTION

An object of the present invention is to provide a kneading degree adjusting apparatus for solving the above problems.

Another object of the present invention is to provide a kneading degree adjusting apparatus capable of widening an adjusting range for a kneading degree even when a gate member and the cylindrical segment are not made so close as to invite a fear of metallic contacts.

According to one aspect of the present invention, a kneading degree adjusting apparatus disposed in a kneading treatment equipment including a cylindrical segment formed at a predetermined portion and a kneading screw for kneading a material while feeding the material to the downstream side, thereby to adjust a kneading degree of the material, includes a gate member having an opposed face confronting an outer circumference of the cylindrical segment and moved toward and away from the outer circumference of the cylindrical segment thereby to change the area of a material passage to be formed between the opposed face and the outer circumference of the cylindrical segment, in which a convex part is formed on one of the outer circumference and the opposed face and a concave part is formed on the other, so that the passage is formed into a bent shape.

BEST MODES FOR CARRYING OUT THE INVENTION

First Embodiment

Hereinafter, a first embodiment of the present invention will be described based on the drawings.

Figure 1:
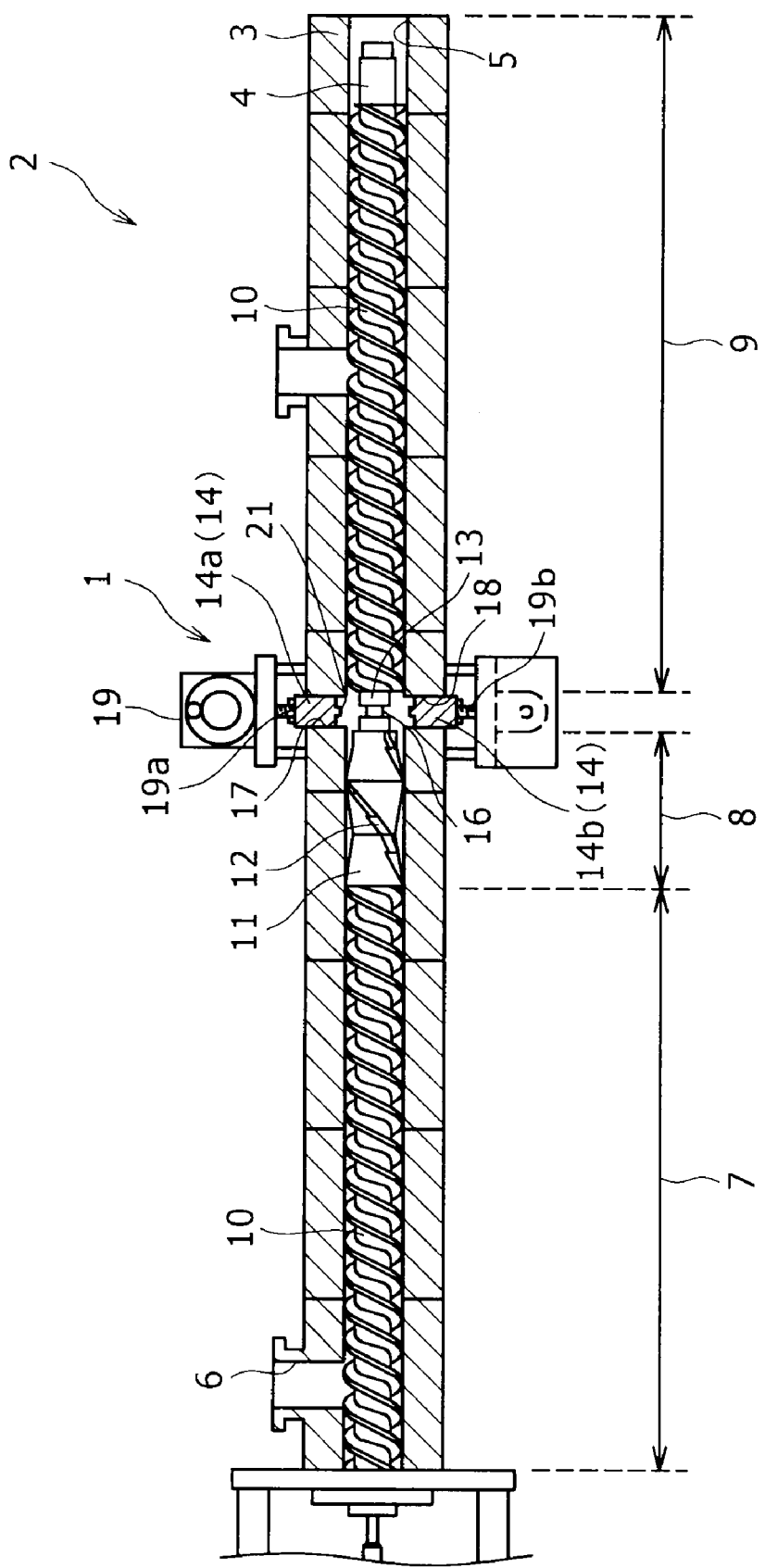
FIG. 1 A front sectional view of an extruder provided with a kneading degree adjusting apparatus of a first embodiment.

As schematically shown in FIG. 1, a kneading degree adjusting apparatus 1 of the first embodiment is disposed in a same-direction rotating and intermeshing type twin screw extruder 2 (hereinafter, sometimes simply referred to as extruder 2). This extruder 2 is included in the concept of a kneading treatment equipment of the present invention. The extruder 2 has a hollow barrel 3 and a pair of kneading screws 4, 4 inserted into this hollow barrel 3 along the axial direction.

In the extruder 2, the kneading screws 4, 4 are rotated in the barrel 3, so that a material is fed to the downstream side while being kneaded.

It should be noted that the left side on a paper of FIG. 1 will be indicated as the upstream side for describing the extruder 2, and the right side on the paper of FIG. 1 will be indicated as the downstream side. The direction along a rotation axis of the kneading screws 4 will be called the axial direction for describing the extruder 2, and this axial direction matches with the left and right direction of the paper of FIG. 1. Further, the direction perpendicular to the axial direction will be called the axially perpendicular direction.

The barrel 3 is formed into a long tubular shape along the axial direction. A spectacle-frame-shape hollow part 5 which is long along the axial direction is formed inside the barrel 3. A pair of the kneading screws 4, 4 is rotatably inserted into this hollow part 5.

The barrel 3 has a material supply port 6 at a position on the upstream side in the axial direction. The material can be supplied to the hollow part 5 through this material supply port 6. A heating device (not shown) using an electric heater or heated oil is provided in the barrel 3. The material supplied to the hollow part 5 through the material supply port 6 is heated by this heating device so as to be in a melted state or a semi-melted state.

The kneading screws 4 are inserted into the hollow part 5 of the barrel 3 and provided on the left and right sides respectively. Each of the kneading screws 4 has a spline shaft (not shown) which is long in the axial direction, and this spline shaft is fitted through a plurality of segment members forming the kneading screw 4 so as to fix them.

There are various kinds of segment members forming the kneading screws 4. In the kneading screws 4, by combining multiple kinds of segment members, a feeding section 7 in which the material is fed, a kneading section 8 in which the material is kneaded, an extruding section 9 in which the kneaded material is fed to the downstream side and the like are formed in predetermined ranges respectively in the axial direction of the kneading screws 4. It should be noted that the kneading screws 4 of the present embodiment have one feeding section 7, one kneading section 8 and one extruding section 9 in order from the upstream side.

The feeding section 7 is formed by a plurality of screw segments 10 arranged in the axial direction. The screw segments 10 are provided with screw flights twisted into screw shapes in the axial direction. The screw flights are rotated in accordance with rotation of the screw segments 10, so that the material is fed from the upstream side to the downstream side.

The kneading section 8 is formed by a plurality of rotor segments 11 (three rotor segments in the present embodiment) arranged in the axial direction. Each of these rotor segments 11 has a plurality of kneading flights 12 (two kneading flights in the present embodiment) twisted into screw shapes in the axial direction. The kneading flights 12 are rotated in accordance with rotation of the kneading section 8, so that the material passes through tip clearances between tip parts of the kneading flights 12 and an inner wall surface of the barrel 3. Thereby, the material is sheared (kneaded). It should be noted that although the kneading section 8 formed only by the rotor segments 11 with positive twist angles in the direction in which the material is fed to the downstream side is shown in the present embodiment, the kneading section 8 may be formed by a plurality of kneading disc segments or formed by both the rotor segments 11 and the kneading disc segments. Rotor segments having kneading flights with zero or negative twist angles may be added to the kneading section 8.

The extruding section 9 has a plurality of screw segments 10 provided with screw flights twisted into screw shapes, similarly as the feeding section 7. A plurality of these screw segments 10 is arranged in line in the axial direction. Segment length of the screw segments 10 of the extruding section 9 is gradually reduced toward the downstream side. Therefore, in the extruding section 9, moving speed (feeding speed) of the material is gradually lowered toward the downstream side so that the material can be pressurized.

Next, the kneading degree adjusting apparatus 1 will be described.

Figure 2:
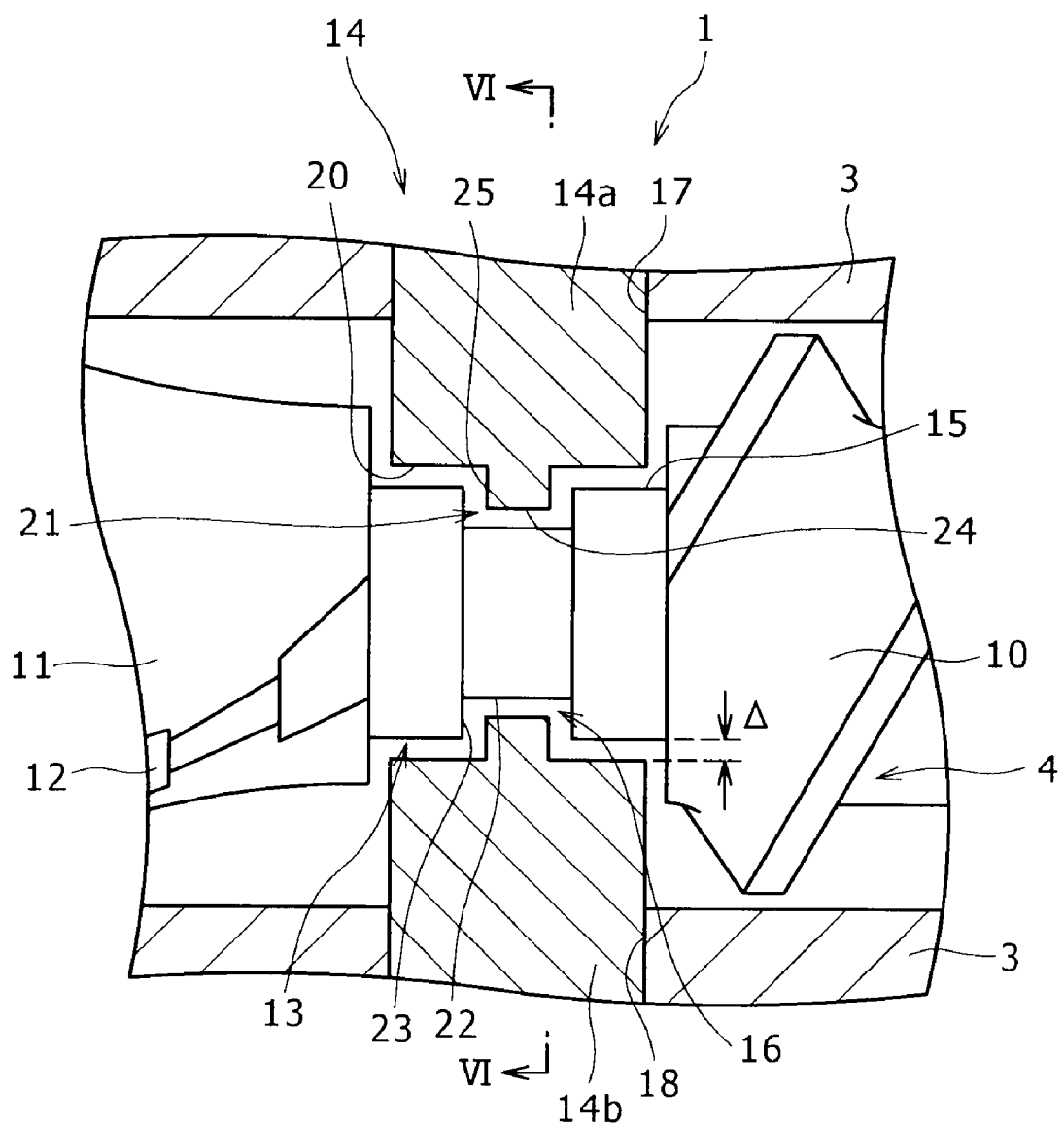
FIG. 2 A partially enlarged sectional view of the kneading degree adjusting apparatus of the first embodiment.

As shown in FIG. 2, the kneading degree adjusting apparatus 1 of the present embodiment is provided on the downstream side of the kneading section 8 and at a position adjacent to the kneading section 8.

In the kneading degree adjusting apparatus 1, an opposed face 20 of a gate member 14 confronting an outer circumference 15 of a cylindrical segment 13 provided in the kneading screw 4 is moved toward and away from the outer circumference 15 of the cylindrical segment 13, so that the area of a passage to be formed between the opposed face 20 of the gate member 14 and the outer circumference 15 of the cylindrical segment 13 is changed, thereby to adjust a kneading degree of the material. In the kneading degree adjusting apparatus 1 of the present embodiment, a convex part is formed on one of the outer circumference 15 of the cylindrical segment 13 and the opposed face 20 of the gate member 14 and a concave part facing the convex part is formed on the other, so that the passage is formed into a bent shape.

Specifically, the kneading degree adjusting apparatus 1 is provided with the gate member 14 and a drive mechanism 19. The kneading screws 4 are provided with the cylindrical segment 13 between the kneading section 8 and the extruding section 9.

The cylindrical segment 13 is formed into a cylindrical shape coaxially with the kneading screws 4, and has a smaller diameter than the rotor segments 11 of the kneading section 8 positioned on the upstream side thereof and the screw segments 10 of the extruding section 9 positioned on the downstream side thereof. The outer circumference 15 of the cylindrical segment 13 is formed so that an axially perpendicular section of the cylindrical segment is formed into a circular shape around the rotation axis of the kneading screws 4. A concave part 16 described in detail later is formed on this outer circumference 15.

A pair of the gate members 14 is formed into plate shapes and provided so as to face each other in the axially perpendicular direction (in the up and down direction in FIG. 2). The gate members 14 are inserted into guide holes passing through the barrel 3 in the axially perpendicular direction. The gate members 14 are movable along the guide holes. The guide holes include a first guide hole 17 formed on one side of the barrel 3 with respect to the kneading screws 4 in the axially perpendicular direction, and a second guide hole 18 formed on the other side of the barrel 3 with respect to the kneading screws 4 in the axially perpendicular direction. The gate members 14 include a first gate member 14a to be attached to the first guide hole 17, and a second gate member 14b to be attached to the second gate member 18.

The drive mechanism 19 is connected to these gate members 14a, 14b as shown in FIG. 1. The drive mechanism 19 has a drive section including an electric motor, an upper gear mechanism, a lower gear mechanism, a transmission mechanism, an upper screw mechanism 19a, and a lower screw mechanism 19b. The electric motor of the drive section has a rotation axis part extending in the horizontal direction. This rotation axis part is connected to the upper gear mechanism and also connected to the lower gear mechanism via the transmission mechanism. The upper screw mechanism 19a is connected to the upper gear mechanism, and this upper screw mechanism 19a is attached to an upper part of the first gate member 14a. The lower screw mechanism 19b is connected to the lower gear mechanism, and this lower screw mechanism 19b is attached to a lower part of the second gate member 14b. Rotation force around a horizontal axis of the rotation axis part rotated by drive of the drive section is converted into rotation force around a vertical axis by the upper gear mechanism, and then applied to the upper screw mechanism 19a. This upper screw mechanism 19a moves the first gate member 14a upward or downward (in the axially perpendicular direction) by the applied rotation force. Meanwhile, the rotation force around the horizontal axis of the rotation axis part is also transmitted to the lower gear mechanism via the transmission mechanism. The rotation force transmitted to this lower gear mechanism is converted into the rotation force around the vertical axis by the lower gear mechanism, and then applied to the lower screw mechanism 19b. This lower screw mechanism 19b moves the second gate member 14b upward or downward (in the axially perpendicular direction) by the applied rotation force.

Since the gate members 14a, 14b are moved in the axially perpendicular direction by the drive mechanism 19 as described above, the opposed faces 20 of a pair of the gate members 14a, 14b confronting the outer circumference 15 are moved toward and away from the outer circumference 15 of the cylindrical segment 13. That is, the opposed faces 20 confronting the outer circumference 15 of the cylindrical segment 13 are, respectively, formed on the lower end side of the first gate member 14a and on the upper end side of the second gate member 14b in FIG. 2. The opposed faces 20 of both the gate members 14a, 14b are formed so that axially perpendicular sections of the gate members are formed into arc shapes around the rotation axis of the kneading screws 4 when both the gate members 14a, 14b are moved the closest to the cylindrical segment 13. The opposed faces 20 of both the gate members 14a, 14b are moved toward the outer circumference 15 of the cylindrical segment 13 as both the gate members 14a, 14b are moved toward each other, and moved away from the outer circumference 15 of the cylindrical segment 13 as both the gate members 14a, 14b are moved away from each other.

Therefore, a clearance $\Delta$ formed between the opposed face 20 of the gate member 14 and the outer circumference 15 of the cylindrical segment 13 is changed in accordance with a degree of movement of the gate member 14 toward and away from the cylindrical segment 13. At the same time, the area of the material passage formed by the clearance $\Delta$, that is, an axially perpendicular sectional area of the passage is also changed. It should be noted that the above clearance $\Delta$ is set to be not less than 1% of a screw diameter D in order to prevent metallic contacts between the gate member 14 and the cylindrical segment 13.

Thus, in a state that the opposed face 20 of the gate member 14 is moved the closest to the outer circumference 15 of the cylindrical segment 13 (hereinafter, a gate close state), the clearance $\Delta$ takes a minimum value. When the clearance $\Delta$ takes the minimum value, passage resistance is increased so that the material does not easily flow to the downstream. As a result, kneading of the material is progressed in the kneading section 8, and the kneading degree of the material is increased. Meanwhile, in a state that the opposed face 20 of the gate member 14 is moved the most distant from the outer circumference 15 of the cylindrical segment 13 (hereinafter, a gate open state), the clearance $\Delta$ is extended contrary to the close state. In this state, the material does not remain but flows to the downstream, and the kneading degree of the material is decreased.

As described above, in the kneading degree adjusting apparatus 1, the gate member 14 is moved toward and away from the cylindrical segment 13, so that the above clearance $\Delta$ is changed and the area of the passage through which the material passes is changed. Thereby, the kneading degree of the material is adjusted.

In the kneading degree adjusting apparatus 1, in order to increase the kneading degree of the material in the gate close state in comparison to conventional kneading degree adjusting mechanisms, the convex part is formed on one of the outer circumference 15 and the opposed face 20, and the concave part is formed on the other so that the material passage to be formed between the opposed face 20 of the gate member 14 and the outer circumference 15 of the cylindrical segment 13 is formed into a bent shape.

More specifically, in the present embodiment, a concave part 16 depressed annularly around the rotation axis of the kneading screws 4 is formed on the outer circumference 15 of the cylindrical segment 13, and a convex part 21 is formed on the opposed face 20 of the gate member 14 at a position where the convex part faces the concave part 16. In the gate close state, the convex part 21 comes into the concave part 16 so that the passage bent in the axial direction is formed between the both.

Consequently, the material flows and meanders in the passage. As a result, the passage resistance can be increased in comparison to a case where the material linearly flows in the axial direction.

The concave part 16 is formed by depressing a part of the outer circumference 15 of the cylindrical segment 13 (a center part in the axial direction in the present embodiment) in the axially perpendicular direction. The concave part 16 is formed annularly around the rotation axis of the kneading screws 4. In other words, the concave part 16 is formed over the entire area in the circumferential direction of the outer circumference 15 of the cylindrical segment 13. In the present embodiment, the concave part 16 is formed as an annular groove which is continuous in the circumferential direction of the cylindrical segment 13.

As shown in FIG. 2, the concave part 16 is provided with a bottom face 22 which is parallel to the outer circumference 15 of the cylindrical segment 13. Side faces 23 are formed on the upstream side and the downstream side of this bottom face 22. A pair of the side faces 23, 23 is formed into planar shapes which are substantially perpendicular to the axial direction.

The convex part 21 is formed by protruding a part in the axial direction of the opposed face 20 of the gate member 14 in the axially perpendicular direction. This convex part 21 has a shape capable of coming into the concave part 16 when the opposed face 20 of the gate member 14 is moved close to the outer circumference 15 of the cylindrical segment 13. Specifically, in the present embodiment, the convex part 21 is formed into a flange shape which is continuous in the circumferential direction of the opposed face 20. It should be noted that the flange shape of the convex part 21 not only indicates a case where the convex part is formed as a flange which is continuous in the circumferential direction but also includes a case where a plurality of protrusions is formed in line in the circumferential direction via slits. However, in this case, a plurality of the protrusions and the slits are formed so that the sum of the opening area of the passage formed by the slits in the gate close state is smaller than the area of the passage in the gate close state when the concave part 16 and the convex part 21 are not provided.

As shown in FIG. 2, the convex part 21 has shorter length in the axial direction than the concave part 16 of the cylindrical segment 13 described above, and is provided at the position corresponding to the concave part 16 in the axial direction so as to be capable of being fitted into the concave part 16.

As shown in FIG. 2, the convex part 21 is provided with a protruding face 24 which is parallel to the bottom face 22 of the concave part 16. This protruding face 24 has a fixed distance from the bottom face 22 of the concave part 16 in the gate close state. A gap between this protruding face 24 and the bottom face 22 is set to be 1% to 3% of the screw diameter in order to prevent the metallic contacts between the gate member 14 and the cylindrical segment 13. In the gate close state, the material flows in this gap along the axial direction. That is, this gap forms a first passage of the material between the concave part 16 and the convex part 21.

As shown in FIG. 2, the convex part 21 is provided with convex side faces 25 provided adjacent to the upstream side and the downstream side of the protruding face 24, respectively. A pair of the convex side faces 25, 25 is formed to be perpendicular to the axial direction. The convex side faces 25 are formed to be parallel to the corresponding side faces 23 of the concave part 16, and arranged so as to have fixed gaps corresponding to 1% to 5% of the screw diameter from the corresponding side faces 23. Therefore, in the gate close state, gaps are formed in the axially perpendicular direction between the side faces 23 of the concave part 16 and the corresponding convex side faces 25, and these gaps form a second passage of the material between the concave part 16 and the convex part 21.

The direction of the first passage and the direction of the second passage are orthogonal to each other. Therefore, the material alternately flowing the first passage and the second passage passes through a route which is bent relative to the axial direction as a whole. Thus, the passage resistance is increased in comparison to the case where the material linearly flows along the axial direction.

Protruding height of the convex part 21, that is, a distance between the protruding face 24 and a part of the opposed face 20 excluding the convex part 21 in the axially perpendicular direction is set to be a larger value than the clearance $\Delta$ between the gate member 14 and the cylindrical segment 13 when the gate member 14 is moved the closest to the cylindrical segment 13, that is, the minimum value of the clearance $\Delta$. In the present embodiment, the minimum value of the clearance $\Delta$ is 1% to 3% of the screw diameter, and the protruding height of the convex part 21 is set to be the larger value than the minimum value of the clearance $\Delta$, specifically the value of 2% to 5% of the screw diameter. Thereby, the protruding face 24 of the convex part 21 passes over the outer circumference 15 of the cylindrical segment 13 and comes into the concave part 16 in the gate close state. Due to this, the material is prevented from linearly flowing between the convex part 21 and the concave part 16 along the axial direction, and the material reliably flows and meanders to go by the convex part 21. As a result, the passage resistance can be increased.

Next, a kneading degree adjusting method of the present embodiment will be described.

The kneading degree adjusting method of the present embodiment will be performed as below.

Firstly, as shown in FIGS. 1 and 2, the material fed from the feeding section 7 is kneaded by the kneading section 8 provided on the downstream side of the feeding section 7. At the time of kneading, the kneading degree adjusting apparatus 1 adjusts the kneading degree.

When the kneading degree is to be increased, the opposed face 20 of the gate member 14 is moved close to the outer circumference 15 of the cylindrical segment 13, that is, the gate close state is set. At this time, the above clearance $\Delta$ is formed between the opposed face 20 of the gate member 14 and the outer circumference 15 of the cylindrical segment 13. Since this clearance $\Delta$ is formed between the outer circumference 15 and the opposed face 20 formed along the axial direction, the material linearly flows in the clearance $\Delta$ along the axial direction. Since the protruding height of the convex part 21 is set to be not less than the clearance $\Delta$ as described above, the material flowing up to the convex part 21 collides with the convex side face 25. After that, the material flows and meanders in the second passage, the first passage and the second passage in order. Therefore, the passage resistance is increased in comparison to the case where the material linearly flows in the axial direction along the clearance $\Delta$. Due to this, the material remains in the kneading section 8 and does not easily flow to the downstream side. As a result, the kneading degree of the material is increased.

Meanwhile, when the kneading degree is to be decreased, the opposed face 20 of the gate member 14 is moved away from the outer circumference 15 of the cylindrical segment 13, so that the gate open state is set. In this gate open state, the gate member 14 is moved back to a position where the opposed face 20 thereof is substantially flush with an inner circumference of the barrel 3. At this time, the convex part 21 protrudes from the opposed face 20 of the gate member 14 toward the inside of the barrel 3. Thus, the passage area is slightly reduced by the convex part 21. However, in a state that the gate member 14 is away from the cylindrical segment 13, the amount of the passage area reduced by the convex part 21 is a little relative to the entire passage area. Therefore, even when the convex part 21 is provided on the opposed face 20 of the gate member 14, essential influence hardly reaches the kneading degree of the material. Thus, in the kneading degree adjusting apparatus 1 of the present embodiment, a lower limit of the kneading degree of the material is almost the same as the case where the material linearly flows along the axial direction.

As described above, in the gate close state, the material flows and meanders in the axial direction so that the kneading degree of the material is increased in comparison to the case where the material linearly flows along the axial direction. Meanwhile, in the gate open state, the kneading degree of the material is almost the same as the case where the material linearly flows along the axial direction. Therefore, in the kneading degree adjusting apparatus 1 of the present embodiment, an adjusting range for the kneading degree can be widened.

Second Embodiment

Figure 3:
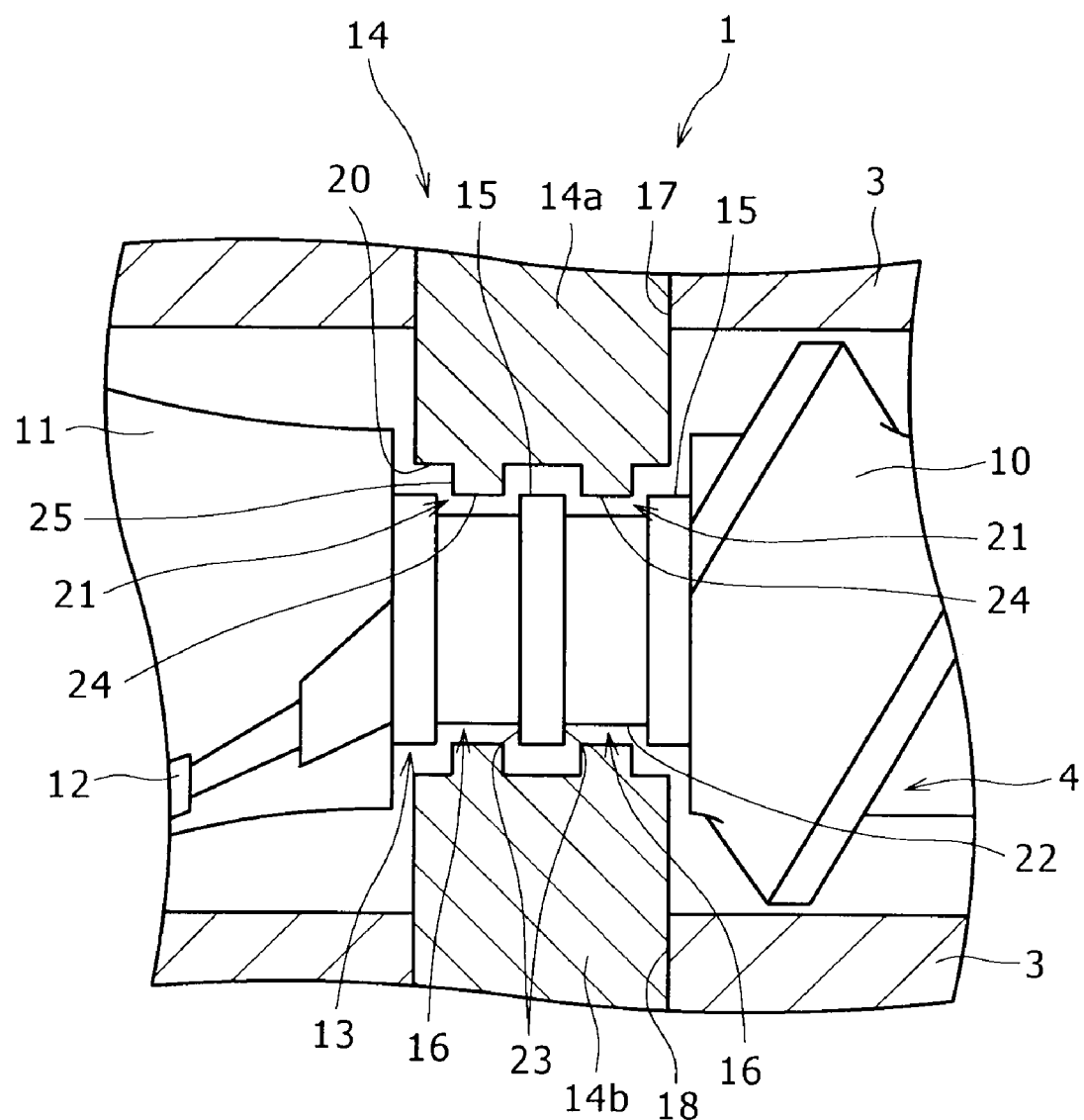
FIG. 3 A partially enlarged sectional view of a kneading degree adjusting apparatus of a second embodiment.

Next, the kneading degree adjusting apparatus 1 of a second embodiment will be described with reference to FIG. 3.

The kneading degree adjusting apparatus 1 of the second embodiment is different from the first embodiment in terms that a plurality of the convex parts 21 is formed in line in the axial direction on the gate member 14 and a plurality of the concave parts 16 is formed in line in the axial direction on the cylindrical segment 13.

That is, a plurality of the convex parts 21 (two convex parts in the present embodiment) is formed in line in the axial direction on the opposed face 20 of the gate member 14 of the second embodiment, and the concave parts 16 equal in number to the convex parts are formed on the outer circumference 15 of the cylindrical segment 13 while corresponding to a plurality of the convex parts 21.

Since a plurality of the convex parts 21 and a plurality of the concave parts 16 are provided as described above, the material passage to be formed between the opposed face 20 of the gate member 14 and the outer circumference 15 of the cylindrical segment 13 meanders more radically than the first embodiment. As a result, the passage resistance can be increased more than the first embodiment, so that the kneading degree of the material can be adjusted over a wider range.

It should be noted that the other configurations in the kneading degree adjusting apparatus 1 of the second embodiment are the same as the first embodiment. Thus, description of the other configurations will be omitted.

Third Embodiment

Figure 4:
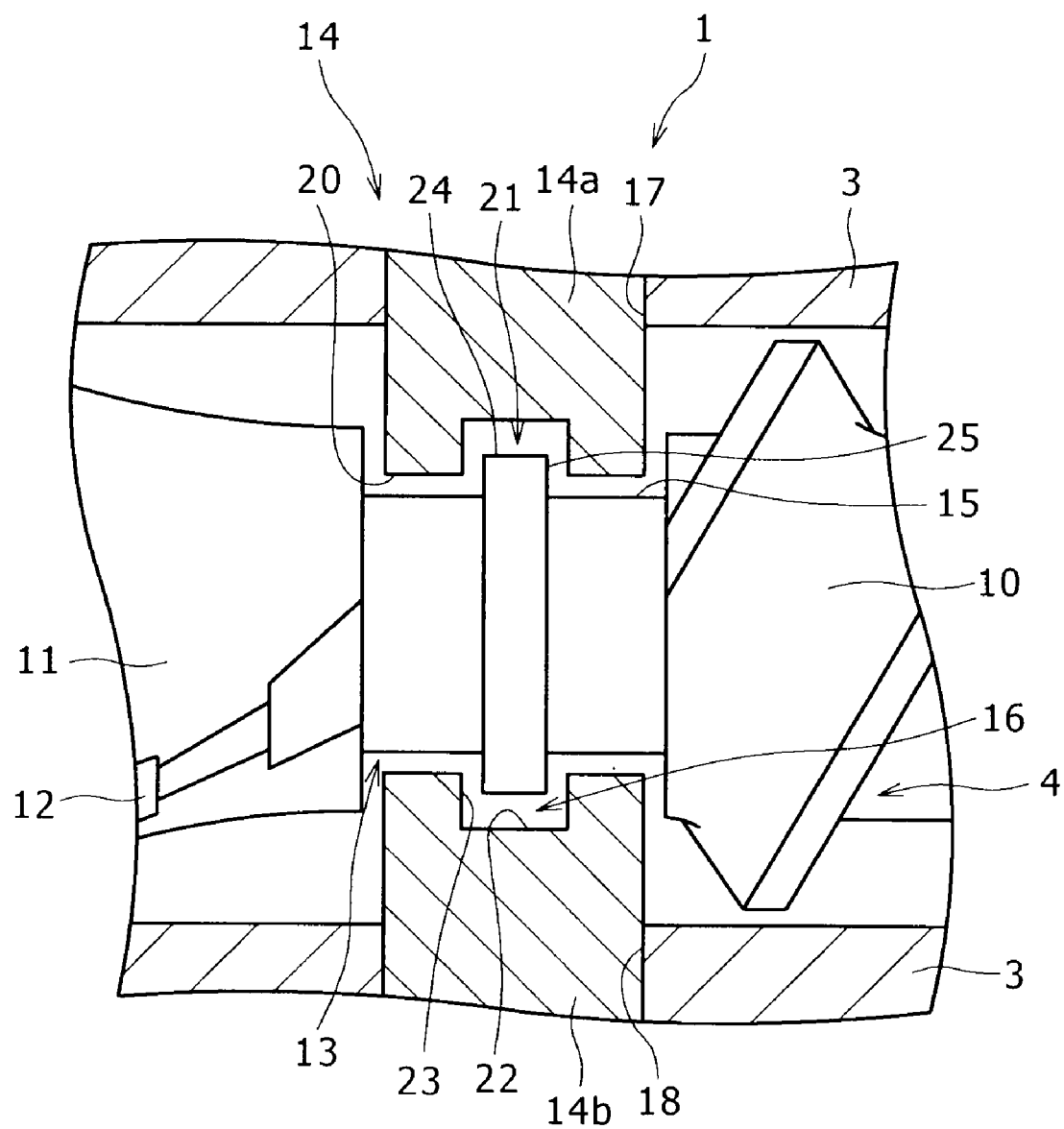
FIG. 4 A partially enlarged sectional view of a kneading degree adjusting apparatus of a third embodiment.

Next, the kneading degree adjusting apparatus 1 of a third embodiment will be described with reference to FIG. 4.

The kneading degree adjusting apparatus 1 of the third embodiment is different from the first embodiment in terms that the member on which the convex part 21 is formed and the member on which the concave part 16 is formed are switched to each other.

That is, in the kneading degree adjusting apparatus 1 of the third embodiment, the convex part 21 is formed on the outer circumference 15 of the cylindrical segment 13, and the concave part 16 is formed on the opposed face 20 of the gate member 14. This concave part 16 is arranged at a position in the axial direction on the opposed face 20 of the gate member 14 which corresponds to the convex part 21.

It should be noted that the other configurations and effects in the kneading degree adjusting apparatus 1 of the third embodiment are the same as the first embodiment. Therefore, description of the other configurations will be omitted.

EXAMPLES

Hereinafter, effects of the kneading degree adjusting apparatus 1 according to the present embodiment on the kneading degree of the material will be described with using examples and a comparative example.

The extruder 2 used in the examples and the comparative example is the same-direction rotating type twin screw extruder 2 in which a pair of the kneading screws 4 (with a maximum rotation outer diameter of 72 mm and the entire length of 2,100 mm) is provided in the barrel 3 in an intermeshing state. In the examples and the comparative example, the material (a polypropylene resin) was heated in the barrel 3 at 240° C. and kneaded at a flow rate (a processing amount) of 500 kg/h while rotating the kneading screws 4 at the rotation speed of 260 rpm.

Comparative Example

In this comparative example, the cylindrical segment 13 with an outer diameter of 57 mm and length of 40 mm is provided in an intermediate part in the axial direction of the kneading screws 4. The kneading degree adjusting apparatus 1 is provided with the gate member 14 with length in the axial direction which is equal to the cylindrical segment 13 at a position in the axial direction which corresponds to the cylindrical segment 13. This gate member 14 can be moved close to the cylindrical segment 13 up to a position where the clearance of 1.5 mm is formed between the outer circumference 15 of the cylindrical segment 13 and the gate member. In this comparative example, the concave part 16 is not formed on the cylindrical segment 13, and the convex part 21 is not formed on the gate member 14.

Figure 5:
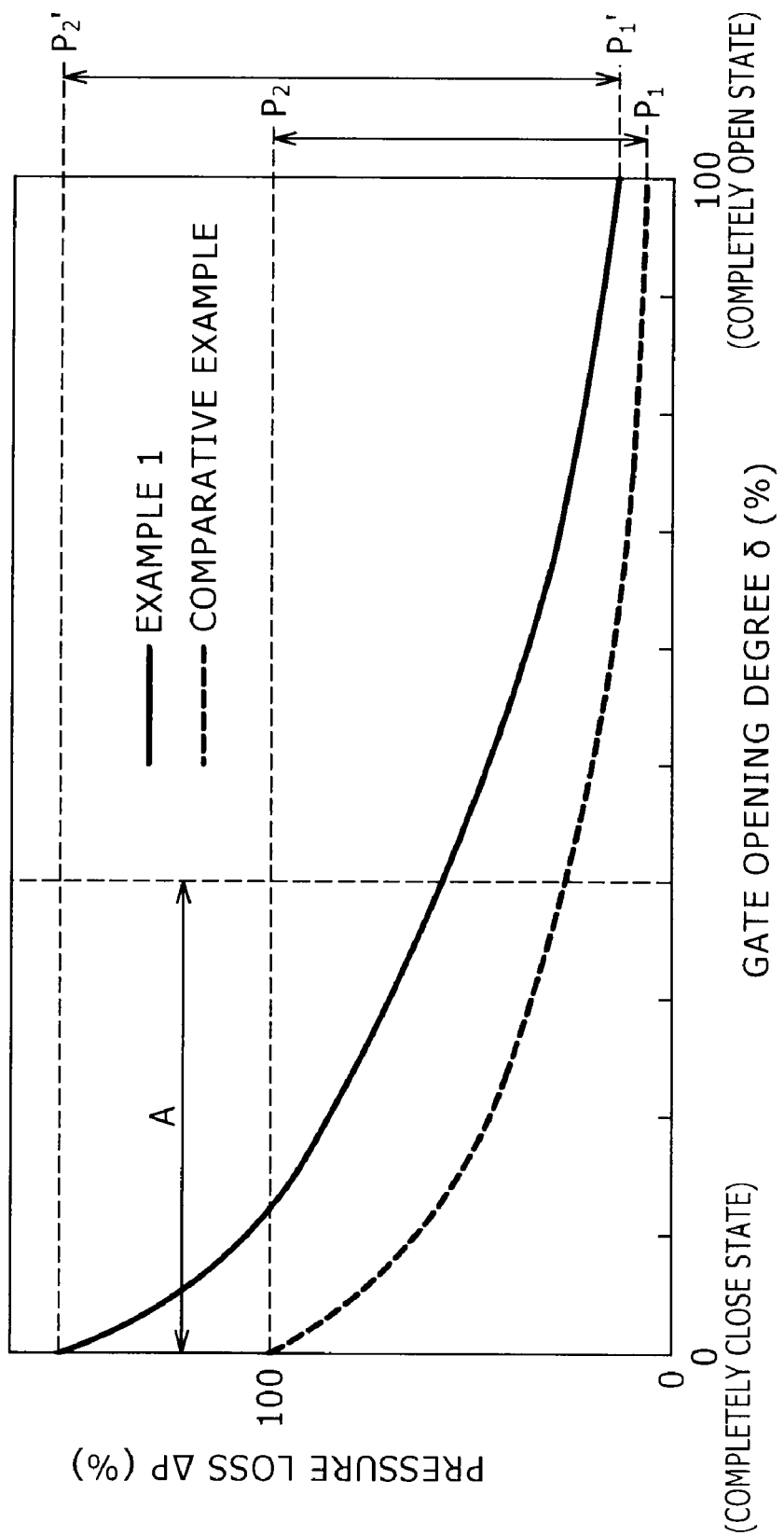
FIG. 5 A graph showing a change in a pressure loss $\Delta P$ generated between the upstream side and the downstream side of the kneading degree adjusting apparatus relative to a gate opening degree $\delta$.

FIG. 5 shows a change in a pressure loss ΔP generated between the upstream side and the downstream side of the kneading degree adjusting apparatus 1 relative to a gate opening degree δ, that is, an opening degree of the gate member 14 in a case where the material is kneaded under the above kneading conditions. Since the pressure loss ΔP is proportional to specific energy given to the material by the kneading degree adjusting apparatus 1 or a remaining time of the material, the pressure loss can be used as an indicator for the kneading degree. Therefore, the pressure loss ΔP generated between the upstream side and the downstream side of the kneading degree adjusting apparatus 1 is used as the indicator for the kneading degree.

It should be noted that the gate opening degree δ shown by the horizontal axis of FIG. 5 is the opening degree of the gate member 14 shown by percentage in a case where the 100% opening degree indicates a completely open state of the gate member 14. The pressure loss ΔP shown by the vertical axis of FIG. 5 is the pressure loss ΔP shown by percentage at each opening degree in a case where the 100% pressure loss ΔP indicates a completely close state of the gate member 14 in the kneading degree adjusting apparatus 1 of the Comparative Example.

The change in the pressure loss ΔP relative to the gate opening degree δ in this comparative example, in other words, the change in the kneading degree will be described as below.

That is, as shown in FIG. 5, the pressure loss ΔP of the comparative example with the 100% gate opening degree δ is $P_1$%. As the gate opening degree δ changes from 100% to 0%, the pressure loss ΔP is gradually increased. In case of the 0% gate opening degree δ, the pressure loss ΔP is $P_2$% which is a maximum value in the comparative example. Therefore, the adjusting range for the kneading degree in the comparative example is indicated as $(P_2-P_1)$ %.

First Example

Meanwhile, in a first example, one convex part 21 with the protruding height of 3.5 mm and the length in the axial direction of 8 mm is formed in a center part in the axial direction of the gate member 14 toward the inner circumference side. The annular concave part 16 with width in the axial direction of 11 mm and depth of 3.5 mm is formed at a position in the axial direction on the cylindrical segment 13 which corresponds to the convex part 21. It should be noted that the other configurations and experiment conditions in the first example are the same as the comparative example.

The change in the pressure loss ΔP relative to the gate opening degree δ in this first example, in other words, the change in the kneading degree will be described as below.

That is, as shown in FIG. 5, the pressure loss ΔP of the first example with the 100% gate opening degree δ is $P_1'$%. The value of $P_1'$ is not largely different from the value of $P_1$ as clear from FIG. 5. Therefore, the kneading degree of the material in the completely open state of the gate member 14 is not largely different between the first example and the comparative example. As a result, even when the convex part 21 is provided on the gate member 14 as in the first example, the kneading degree of the material in the completely open state of the gate member 14 is not largely influenced.

As the gate opening degree δ changes from 100% to 0%, the pressure loss ΔP in the first example is gradually increased. Focusing on an A region in FIG. 5 where the gate opening degree δ is relatively close to the completely close state among the entire range and the kneading degree of the material is remarkably influenced, it is found that the gate opening degree δ in the first example changes relative to the pressure loss ΔP by substantially equal inclination to the comparative example. Based on this, operability of the kneading degree adjusting apparatus 1 in a case where the gate opening degree δ is close to the completely close state in the first example is determined to be the substantially same level as the comparative example. Therefore, even when the kneading degree adjusting apparatus 1 of the first example is used in place of the apparatus of the comparative example, it is determined that there is no problem caused in the operability of the apparatus at the time of adjusting the kneading degree.

Further, in case of the 0% gate opening degree δ, the pressure loss ΔP in the first example is $P_2'$% which is the maximum value. This value of $P_2'$ is a much higher value than the value of $P_2$ as clear from FIG. 5. Therefore, the kneading degree of the material in the completely close state of the gate member 14 is increased in the first example more than the comparative example. As a result, it is thought that the kneading degree of the material in the completely close state of the gate member 14 can be increased in the kneading degree adjusting apparatus 1 of the first example more than the comparative example.

It should be noted that the adjusting range for the kneading degree in the first example is indicated as $(P_2'-P_1')$ %, similarly as well as the comparative example. As described above, $P_1' \approx P_1$ and $P_2' > P_2$, and therefore, $(P_2'-P_1') > (P_2-P_1)$. Thus, the adjusting range for the kneading degree in the kneading degree adjusting apparatus 1 of the first example is widened more than the comparative example.

In the above kneading degree adjusting apparatuses 1 of the second and third embodiments, the values of the pressure loss ΔP (the kneading degree) relative to the same gate opening degree δ tend to be increased more than the comparative example, similarly as the first example. Thus, it is thought that the same result as the first example can also be obtained in the examples to which the kneading degree adjusting apparatuses 1 of the second and third embodiments are applied. It should be noted that detailed description of the examples in which the kneading degree adjusting apparatuses 1 of the second and third embodiments are used will be omitted.

The present invention is not limited to the above embodiments but may be approximately modified in terms of shapes, structure, materials and combination of the members within a range in which the gist of the invention is not altered.

In the above embodiments, the completely intermeshing type twin screw extruder 2 is shown as an example of a kneading treatment apparatus. However, a single screw, triple screw or more screw extruder may be used as the kneading treatment apparatus, or a non-completely intermeshing type extruder may be used. A continuous kneader can be used as the kneading treatment apparatus. In a case where the continuous kneader is used, the segment members may not be separated from the spline shaft but integrated with it.

Arrangement and the number of the feeding section 7 and the kneading section 8 in the kneading screws 4 and arrangement and the number of the kneading degree adjusting apparatus 1 are not limited to the first to third embodiments but may be arbitrarily changed in accordance with types of the material and purposes of kneading.

Figure 6:
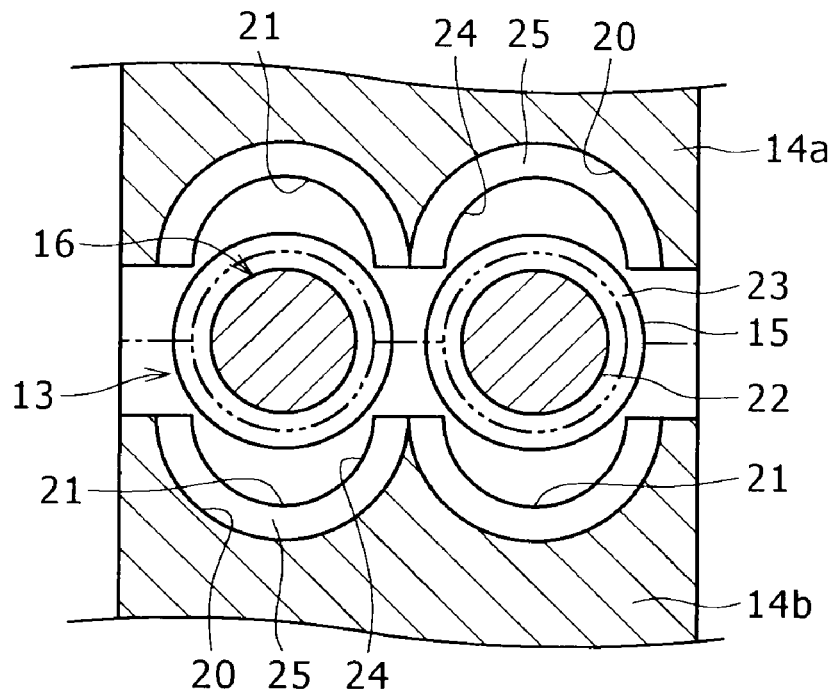
FIG. 6 A sectional view by the line VI-VI in FIG. 2 of the kneading degree adjusting apparatus according to the first embodiment.
Figure 7:
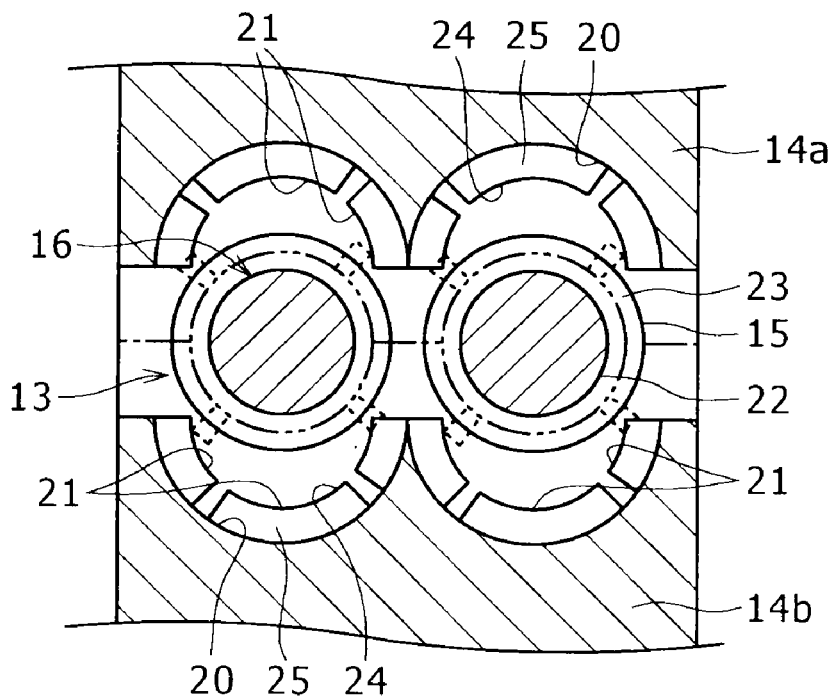
FIG. 7 A sectional view, corresponding to FIG. 6, of the kneading degree adjusting apparatus according to the other embodiments.

In the above embodiments, the flange shape convex part 21 which is continuous in the circumferential direction of the opposed face 20 is fitted into the concave part 16 which is the continuous annular groove is given as an example. Therefore, in case of the first embodiment, for example, as shown in FIG. 6 showing a section by the line VI-VI in FIG. 2, the convex part 21 is formed into a flange shape which is continuous in the circumferential direction. However, as shown in FIG. 7, the convex part 21 may be formed into a plurality of protrusions with fixed length arranged in line in the circumferential direction of the opposed face 20 via the slits.

The present invention may be applied to a slot type kneading degree adjusting apparatus. In this case, a cylindrical part (corresponding to the cylindrical segment 13) having a taper face is formed on the kneading screws 4, a gate member is provided so as to be moved toward and away from an outer circumference (the taper face) of this cylindrical part in the axial direction, and a taper face (corresponding to the opposed face) confronting the taper face of the cylindrical part is formed on the gate member. A convex part is arranged on one of the taper faces, and a concave part facing the convex part is arranged on the other so that a passage to be formed between both the taper faces is formed into a bent shape.

The bent shape of the passage in the present invention is not limited to a mode of bending at a right angle. That is, an angle of bending the passage may be appropriately set. For example, the convex part 21 of the gate member 14 is formed so that a section thereof along the axial direction of the kneading screws 4 is a trapezoid, the concave part 16 of the cylindrical segment 13 is formed into a shape which matches with this, and space between the convex part 21 and the concave part 16 may serve as the passage. Bent points of the passage may be locally curved. For example, an edge part formed by the protruding face 24 of the convex part 21 of the gate member 14 and the convex side face 25 and an edge part formed by the opposed face 20 of the gate member 14 and the convex side face 25 are rounded, and edge parts formed by the bottom face 22 and side faces 23 of the concave part 16 of the cylindrical segment 13 and edge parts formed by the outer circumference 15 of the cylindrical segment 13 and the side faces 23 of the concave part 16 are rounded, so that the bend points of the passage may be curved.

Summary of the Embodiments

The embodiments will be summarized as below.

That is, the kneading degree adjusting apparatus of the embodiments disposed in the kneading treatment equipment including the cylindrical segment formed at a predetermined portion and the kneading screws for kneading the material while feeding the material to the downstream side, thereby to adjust the kneading degree of the material, includes the gate member having the opposed face confronting the outer circumference of the cylindrical segment and moved toward and away from the outer circumference of the cylindrical segment thereby to change the area of the material passage to be formed between the opposed face and the outer circumference of the cylindrical segment, in which the convex part is formed on one of the outer circumference and the opposed face and the concave part is formed on the other, so that the passage is formed into a bent shape.

In this kneading degree adjusting apparatus, when the gate member is moved the closest to the cylindrical segment, the material flows to the downstream side through the passage to be formed between the gate member and the cylindrical segment. In this kneading degree adjusting apparatus, the convex part is formed on one of the outer circumference of the cylindrical segment and the opposed face of the gate member and the concave part is formed on the other, so that the passage is formed into a bent shape. Thus, the passage resistance is increased more than the case where the material flows in the passage which linearly extends along the axial direction so that the material does not easily flow to the downstream side. Therefore, the kneading degree of the material when the gate member is moved close to the cylindrical segment is increased, so that the adjusting range for the kneading degree can be widened. Thus, in this kneading degree adjusting apparatus, even when the gate member and the cylindrical segment are not made so close as to invite a fear of metallic contacts, the adjusting range for the kneading degree can be widened.

It should be noted that the concave part may be formed by depressing a part in the axial direction of one of the outer circumference and the opposed face, the concave part may be formed over the entire area in the circumferential direction of the one, the convex part shaped so as to be capable of coming into the concave part may be formed on the other of the outer circumference and the opposed face, and the passage may be formed between the concave part and the convex part in a state that the convex part comes into the concave part.

With this, when the gate member is moved close to the cylindrical segment and the convex part comes into the concave part, the bent passage is formed between the convex part and the concave part and the material flows and meanders between the convex part and the concave part. Therefore, the passage resistance can be increased so that the kneading degree of the material can be increased. In this configuration, when the gate member is moved close to the cylindrical segment, the convex part can come into the concave part. Thus, the gate member can be moved further closer to the cylindrical segment while avoiding the metallic contacts between the gate member and the cylindrical segment. As a result, the upper limit of the kneading degree of the material can be raised. Therefore, in this configuration, the adjusting range for the kneading degree can be widened while avoiding the metallic contacts between the gate member and the cylindrical segment.

The protruding height of the convex part is preferably set to be a value larger than the clearance between the opposed face of the gate member and the outer circumference of the cylindrical segment except the convex part and the concave part when the gate member is moved the closest to the cylindrical segment.

With this, when the gate member is moved the closest to the cylindrical segment, a tip of the convex part goes over the clearance and comes into the concave part, so that the material passage is necessarily bent relative to the axial direction of the kneading screws.

It should be noted that a plurality of the convex parts and a plurality of the concave parts may be provided in line in the axial direction of the kneading screws. With this, the number of bending of the passage is increased and the passage resistance is further raised. Thus, the adjusting range for the kneading degree of the material can be further widened.

In the extruder or the continuous kneader provided with the above kneading degree adjusting apparatus, the adjusting range for the kneading degree can be widened so as to improve a kneading performance.

The invention claimed is:

1. A kneading degree adjusting apparatus disposed in a kneading treatment equipment including a kneading screw rotatable about a rotational axis for kneading a material while feeding the material to the downstream side, thereby to adjust a kneading degree of the material, comprising:

a gate member having an opposed face confronting an outer circumference of a cylindrical segment along the length of the kneading screw and movable toward and away from the outer circumference of the cylindrical segment in a perpendicular direction which is perpendicular to an axial direction parallel to the rotational axis, thereby to change the area of a material passage to be formed between the opposed face and the outer circumference of the cylindrical segment;

a convex part extending convexly from one of the outer circumference and the opposed face in the perpendicular direction; and a concave part recessed concavely from the other of the outer circumference and the opposed face in the perpendicular direction, wherein each of the convex part and the concave part has at least one side face extending in the perpendicular direction, wherein the passage is formed into a bent shape so that a material being kneaded by the kneading treatment equipment and traveling in the axial direction through the material passage formed between the opposed face and the outer circumference of the cylindrical segment is caused to meander and travel in the perpendicular direction, whereby the flow resistance is increased.

2. The kneading degree adjusting apparatus according to claim 1, wherein:

said concave part is formed by depressing a part in the axial direction of one of the outer circumference and the opposed face, said concave part being formed over the entire area in the circumferential direction of the one of the outer circumference and the opposed face, said convex part is shaped so as to be capable of entering said concave part, and the passage is formed between said concave part and said convex part in a state that said convex part comes into said concave part.

3. The kneading degree adjusting apparatus according to claim 2, wherein:

a protruding height of said convex part is set to be larger than a clearance between the opposed face of said gate member and the outer circumference of the cylindrical segment, except at said convex part and said concave part, when said gate member is moved the closest to the cylindrical segment.

4. The kneading degree adjusting apparatus according to claim 2, wherein:

a plurality of said convex parts and a plurality of said concave parts are provided in a line in the axial direction.

5. An extruder provided with the kneading degree adjusting apparatus according to claim 1.

6. A continuous kneader provided with the kneading degree adjusting apparatus according to claim 1.

7. The kneading degree adjusting apparatus according to claim 1, wherein all of the side faces of each of the convex part and the concave part extend in the perpendicular direction, whereby a width of the passage between the side faces is constant.

* * * * *